United States Patent
Cheng

[19]

[11] Patent Number: 5,957,083
[45] Date of Patent: Sep. 28, 1999

[54] POULTRY FEEDER

[75] Inventor: Paul Cheng, Hsinchu Hsien, Taiwan

[73] Assignee: Almin Enterprise Co., Ltd., Hsinchu Hsien, Taiwan

[21] Appl. No.: 09/007,185

[22] Filed: Jan. 15, 1998

[51] Int. Cl.[6] .................................................. A01K 39/012
[52] U.S. Cl. ............................ 119/57.4; 119/53; 119/56.2
[58] Field of Search ........................... 119/52.4, 53, 57.4, 119/56.1, 56.2

[56] References Cited

U.S. PATENT DOCUMENTS

| | | | |
|---|---|---|---|
| 5,097,797 | 3/1992 | Van Zee et al. | 119/57.4 |
| 5,406,907 | 4/1995 | Hart | 119/57.4 X |
| 5,462,017 | 10/1995 | Pollock et al. | 119/57.4 |
| 5,497,730 | 3/1996 | Van Daele et al. | 119/57.4 X |
| 5,765,503 | 6/1998 | Van Daele | 119/57.4 X |

*Primary Examiner*—Michael J. Carone
*Assistant Examiner*—James S. Bergin
*Attorney, Agent, or Firm*—Rosenberg, Klein & Bilker

[57] ABSTRACT

A poultry feeder which includes a feeding tube secured to a delivery pipe of a feed delivery system by a retainer cap, a feed carrier holder suspended from the feeding tube, a feed carrier plate vertically adjustably coupled to the feed carrier holder by a coupling ring to receive feed from the feeding tube, an adjustment socket mounted around the feeding tube and vertically adjustably secured to the holder to control output flow rate of feed from the feeding tube.

8 Claims, 12 Drawing Sheets

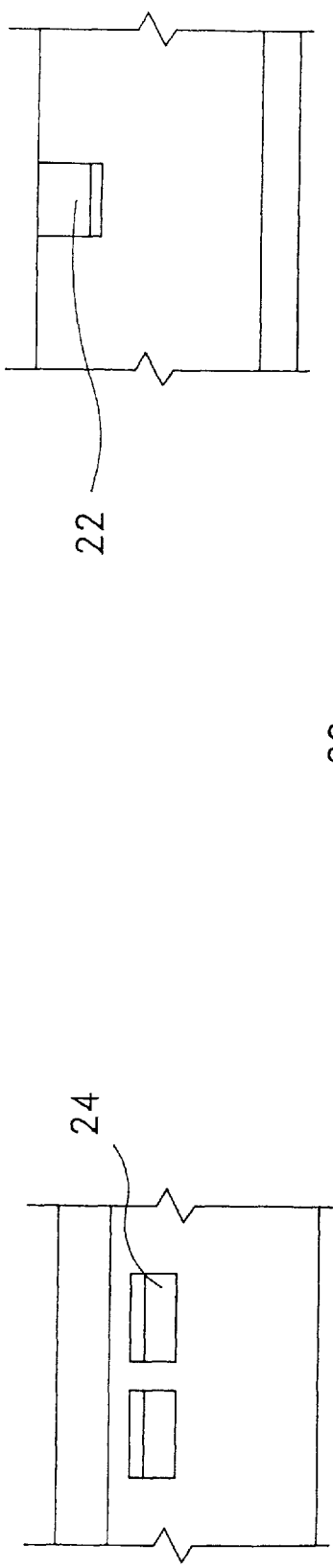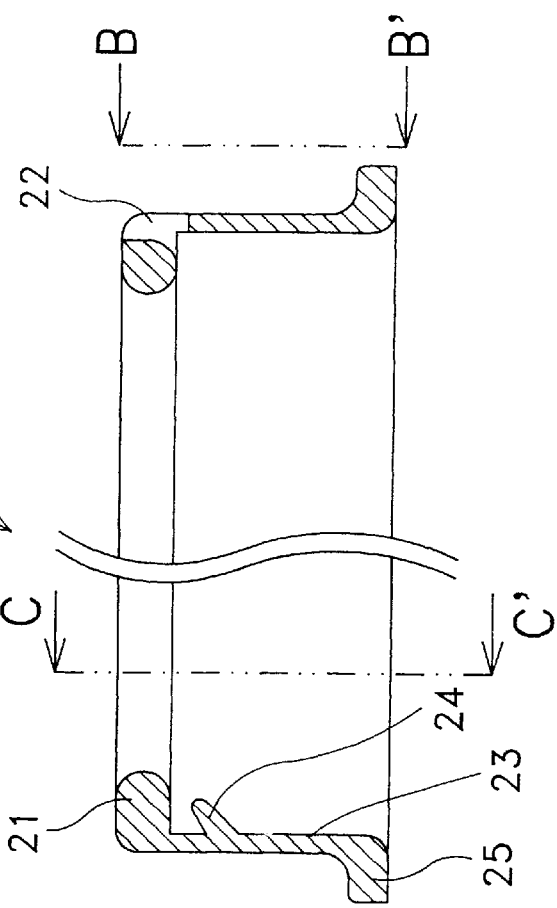

POULTRY FEEDER

BACKGROUND OF THE INVENTION

The present invention relates to a poultry feeder for feeding poultry with feed, and more particularly to such a poultry feeder that is designed for use in an automatic poultry feeding system, and can be conveniently adjusted to control the desired output flow rate of feed.

A variety of poultry feeders are intensively used in different automatic poultry feeding systems in different poultry-farming complexes. Conventional poultry feeders which are designed for feeding the started chicks are not suitable for the growers. Another drawback of the conventional poultry feeders is that they cannot be conveniently detached when washing the feed carrier plate. Furthermore, the output flow rate of feed at each poultry feeder in an automatic poultry feeding system cannot be separately adjusted.

SUMMARY OF THE INVENTION

The present invention has been accomplished to provide a poultry feeder which eliminates the aforesaid drawbacks.

It is one object of the present invention to provide a poultry feeder which can be used for feeding young poultry as well as grown-up poultry. It is another object of the present invention to provide a poultry feeder which can be conveniently adjusted to control the desired output flow rate of feed. It is still another object of the present invention to provide a poultry feeder which is detachable. To achieve these and other objects of the present invention, there is provided a poultry feeder which is comprised of a feeding tube secured to a delivery pipe of a feed delivery system by a retainer cap, a feed carrier holder suspended from the feeding tube, a feed carrier plate vertically adjustably coupled to the feed carrier holder by a coupling ring to receive feed from the feeding tube, an adjustment socket mounted around the feeding tube and vertically adjustably secured to the holder to control output flow rate of feed from the feeding tube.

BRIEF DESCRIPTION OF THE DRAWINGS

FIG. 4 is a sectional view taken along line A—A' of FIG. 1.

FIG. 4A is a sectional view taken along line B—B' of FIG. 4.

FIG. 4B is a sectional view taken along line C—C' of FIG. 4.

DETAILED DESCRIPTION OF THE PREFERRED EMBODIMENT

Figure 1:
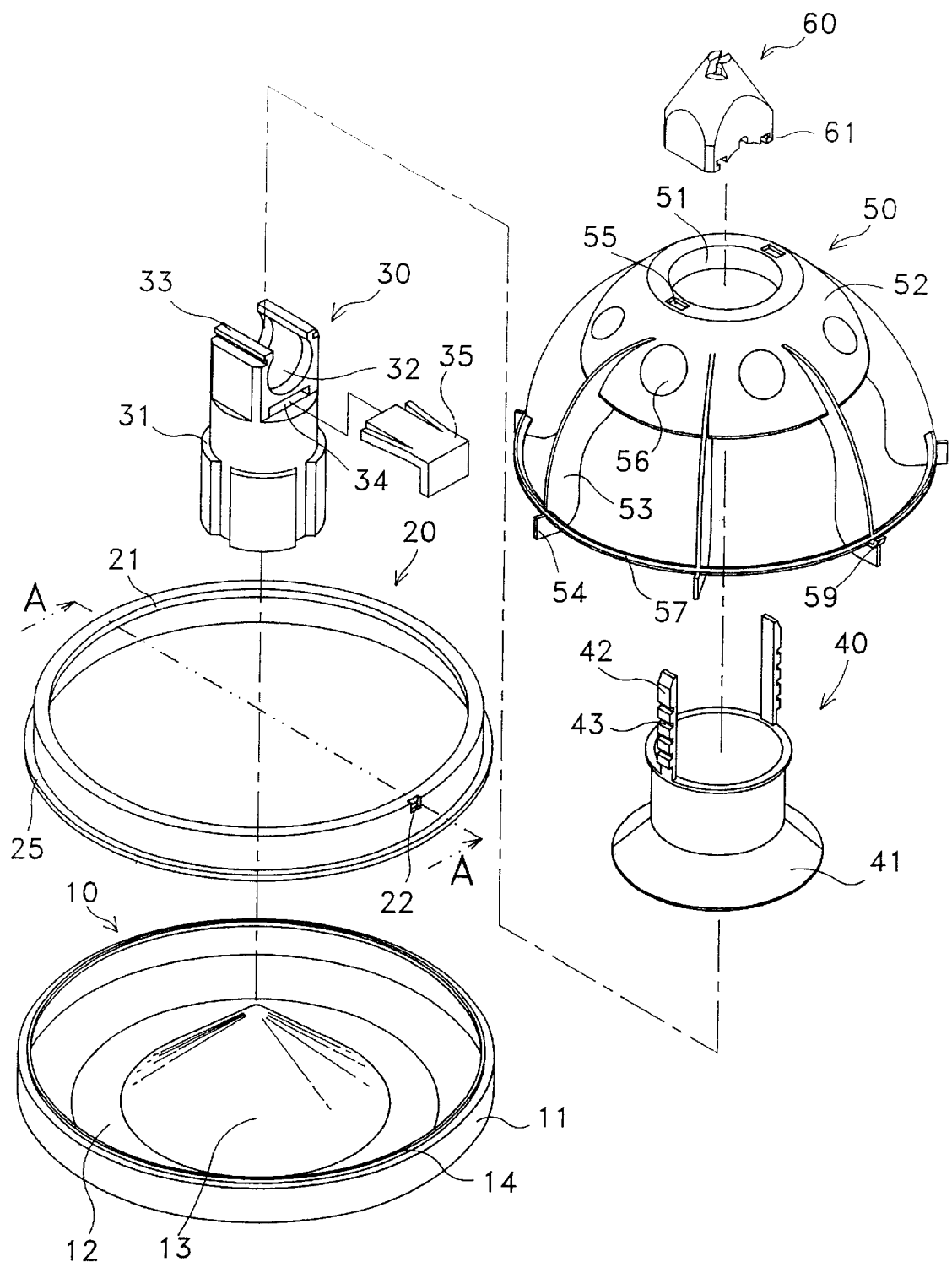
FIG. 1 is an exploded view of a poultry feeder according to the present invention.
Figure 2:
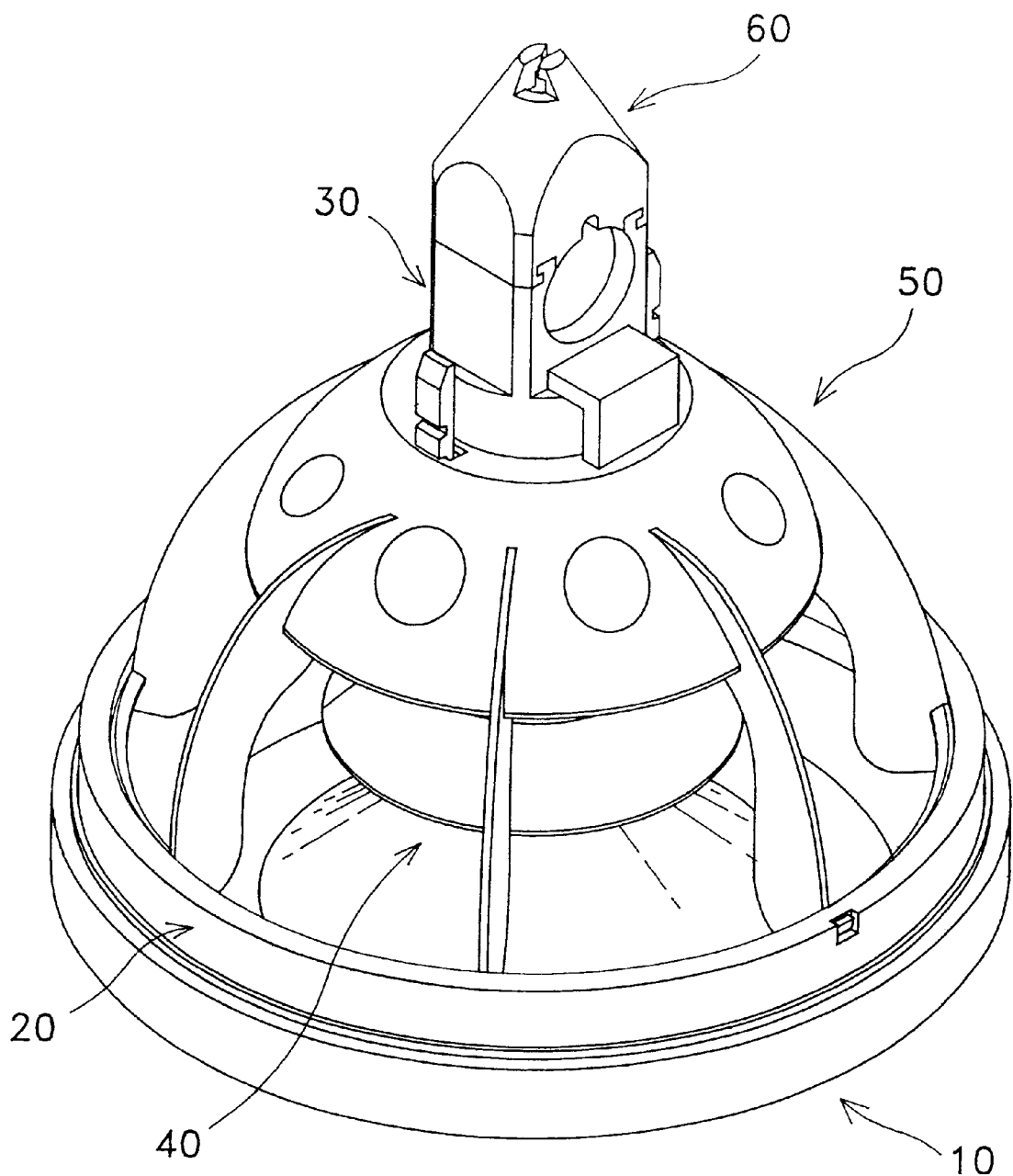
FIG. 2 is a perspective assembly view of the poultry feeder shown in FIG. 1.

Referring to FIGS. 1 and 2, a poultry feeder in accordance with the present invention is generally comprised of a feed carrier plate 10, a coupling ring 20, a feeding tube 30, an adjustment socket 40, a feed carrier holder 50, and a retainer cap 60.

Figure 3:
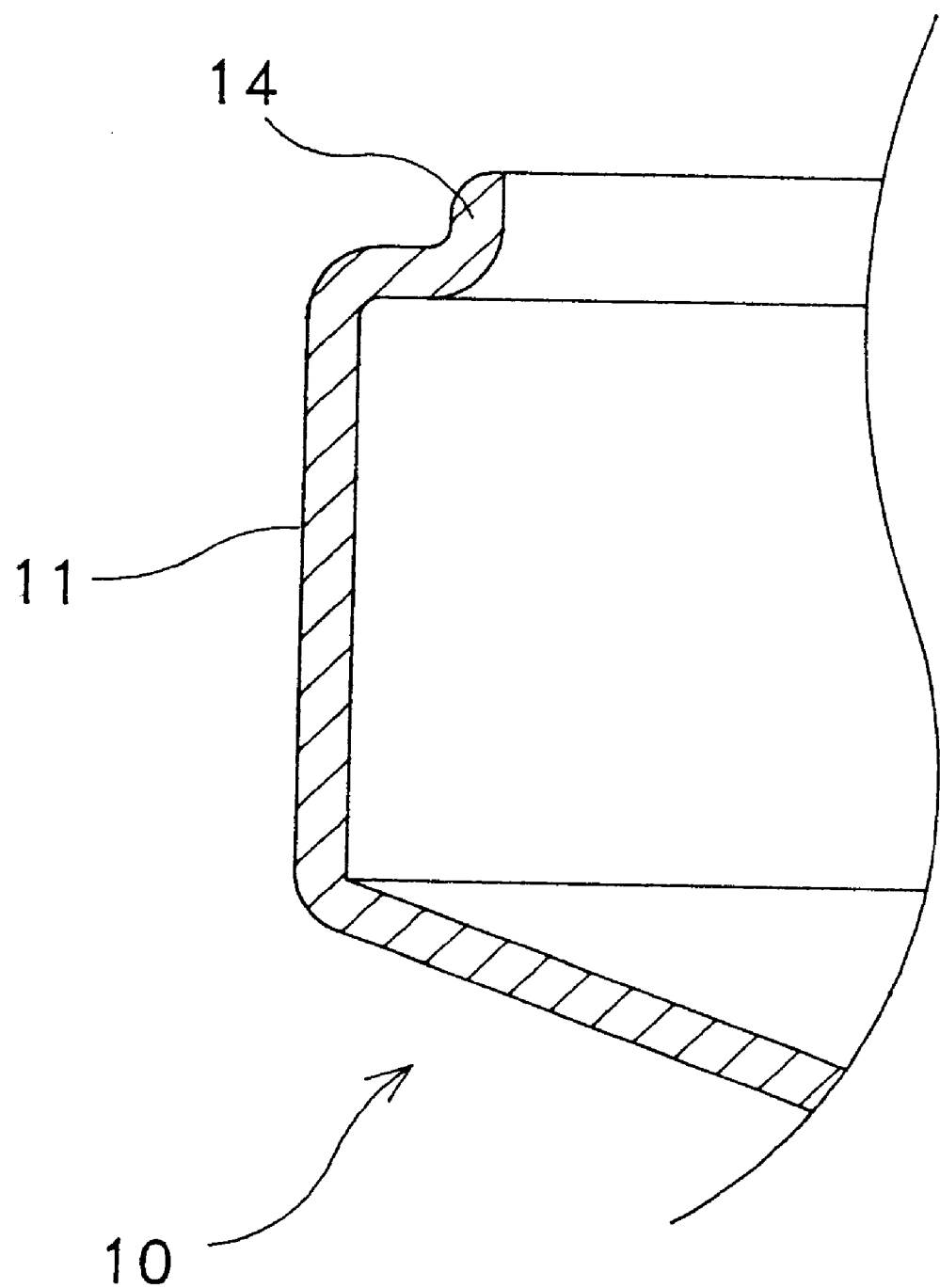
FIG. 3 is a sectional view in an enlarged scale of a part of the feed carrier plate of the poultry feeder shown in FIG. 1.

Referring to FIG. 3 and FIG. 1, the feed carrier plate 10 comprises a bottom wall 12, an upright annular wall 11 raised around the border of the bottom wall 12, an inward coupling flange 14 perpendicularly inwardly extended from the topmost edge of the upright annular wall 11, and a conical projecting portion 13 raised from the top side of the bottom wall 12 at the center. The feed carrier plate 10 defines a chamber around the conical projecting portion 13 for holding feed.

Referring to FIGS. 4, 4A, 4B and 5, and FIGS. 1 and 2 again, the coupling ring 20 comprises an inwardly extended top coupling flange 21, an outwardly extended bottom coupling flange 25, a mounting hole 22 near the top coupling flange 21, a plurality of supporting rods 24 raised from the inside wall 23 thereof below the top coupling flange 21. The bottom coupling flange 25 is coupled to the inward coupling flange 14 of the feed carrier plate 10, and allowed to be moved with the coupling ring 20 along the inside surface of the upright annular wall 11 below the inward coupling flange 14 (see FIG. 5).

Figure 6:
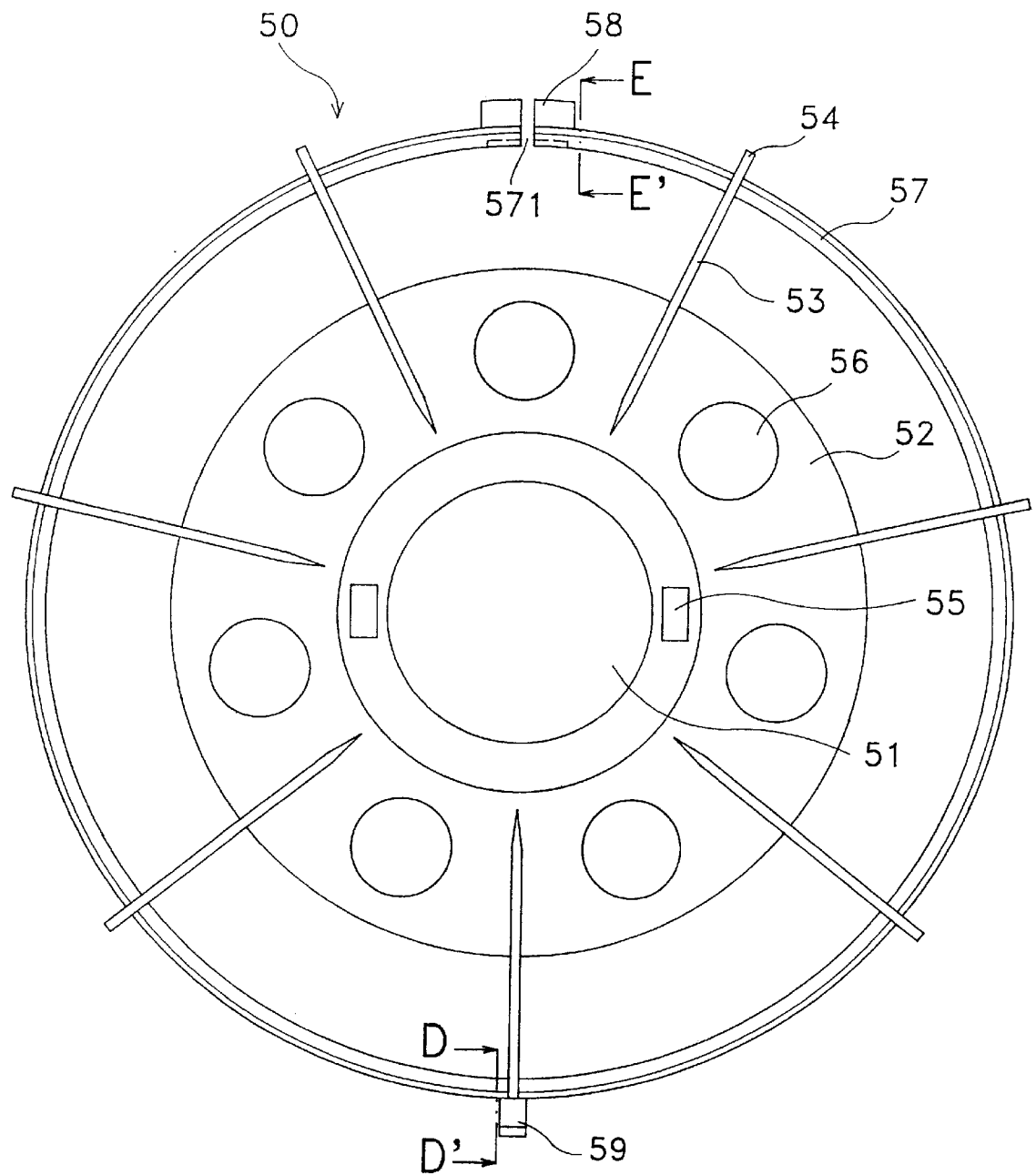
FIG. 6 is a bottom plan view in an enlarged scale of the feed carrier holder according to the present invention.
Figure 6A:
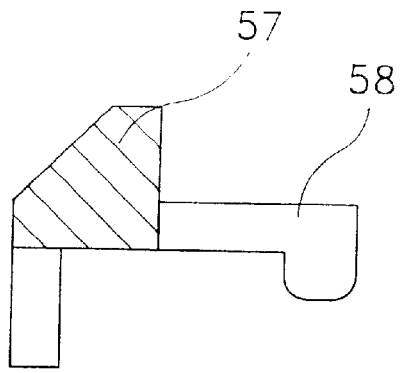
FIG. 6A is a sectional view in an enlarged scale taken along line E—E' of FIG. 6.
Figure 6B:
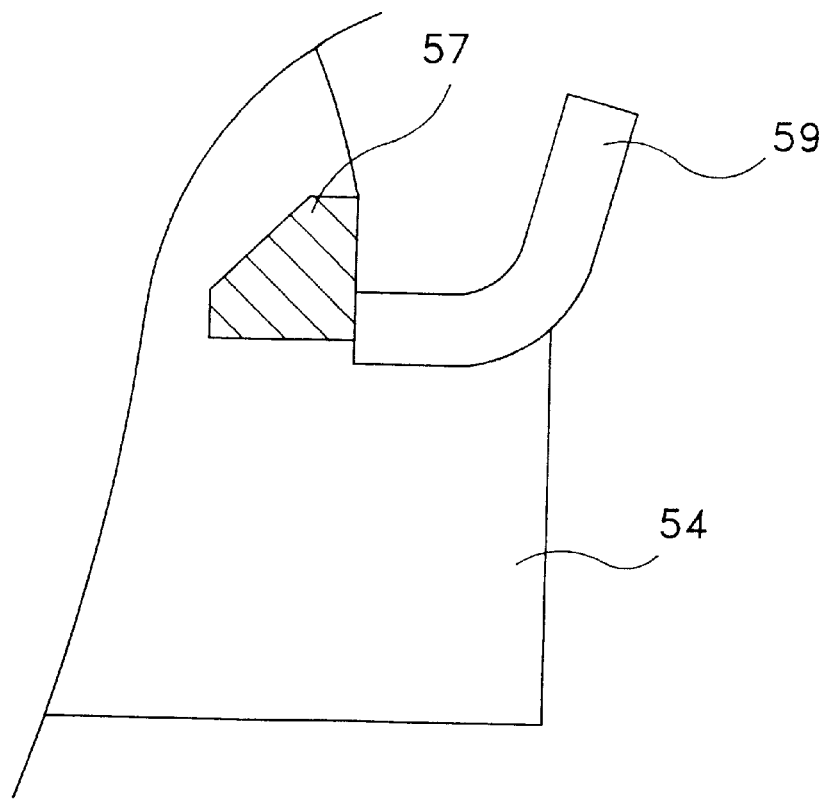
FIG. 6B is a sectional view in an enlarged scale taken along line D—D' of FIG. 6.

Referring to FIGS. 6, 6A and 6B and FIG. 1 again, the feed carrier holder 50 comprises a dome 52, which has a center mounting hole 51, two rectangular notches 55 horizontally aligned at two opposite sides of the center mounting hole 51, a plurality of downward locating flanges 551 axially downwardly extended from the border of the center mounting hole 51 (see FIG. 9), and a plurality of through holes 56 spaced around the center mounting hole 51, a plurality of arched ribs 53 radially downwardly extended from the dome 52 and terminating in a respective outwardly extended stop endpiece 54, a split binding ring 57 fixedly fastened to the stop endpieces 54 of the arched ribs 53 at the top, two angled strips 58 respectively extending from two opposite ends of the split binding ring 57 and spaced by a gap 571, and a curved locating rod 59 extending from the binding ring 57 opposite to the angled strips 58.

Figure 7:
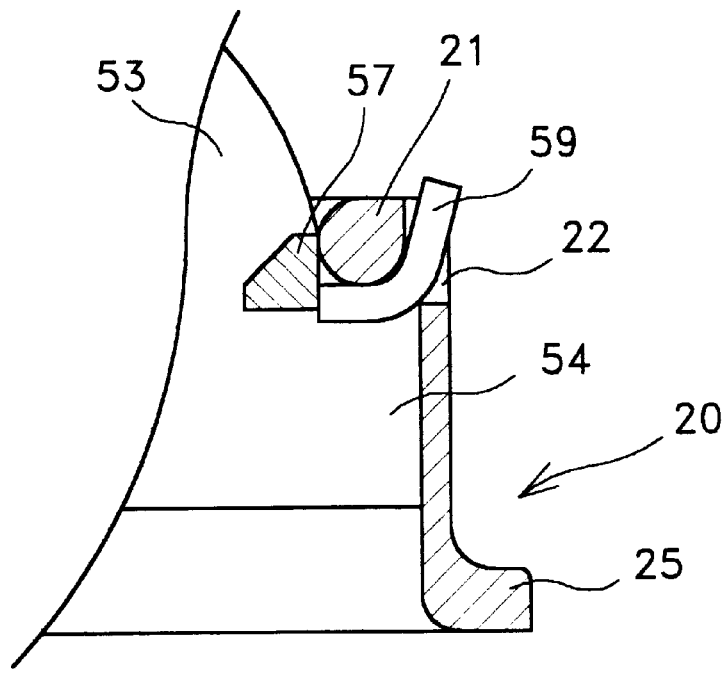
FIG. 7 is a sectional view in an enlarged scale of a part of the present invention, showing the curved retaining rod of the feed carrier holder fastened to the mounting hole on the coupling ring.
Figure 8:
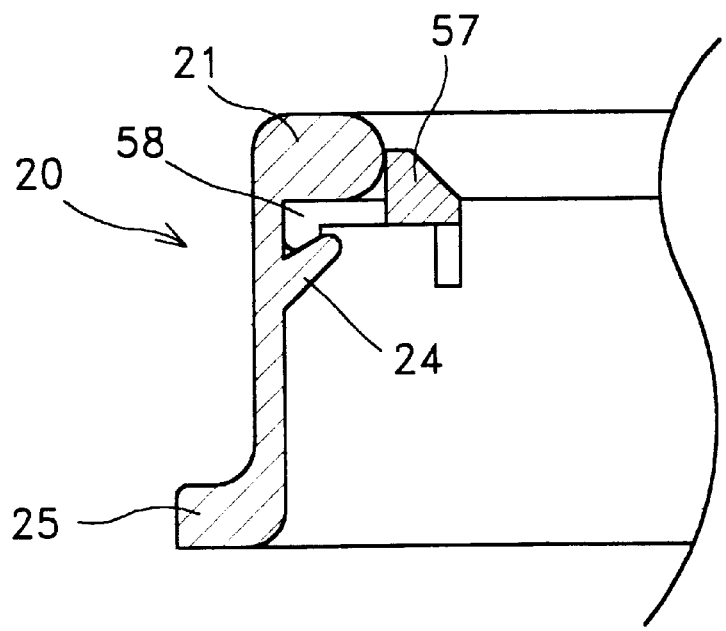
FIG. 8 is a sectional view in an enlarged scale of a part of the present invention, showing the angled strips of the feed carrier holder engaged with the supporting rods on the coupling ring.

Referring to FIGS. 7 and 8 and FIGS. 1 and 2 again, the curved locating rod 59 of the feed carrier holder 50 is inserted into the mounting hole 22 on the coupling ring 20 from the inside, then the angled strips 58 of the feed carrier holder 50 are closed together and inserted with the endpieces 54 of the arched ribs 53 in between the top coupling flange 21 and the supporting rods 24 of the coupling ring 20, and therefore the feed carrier holder 50 and the coupling ring 20 are coupled together.

Figure 9:
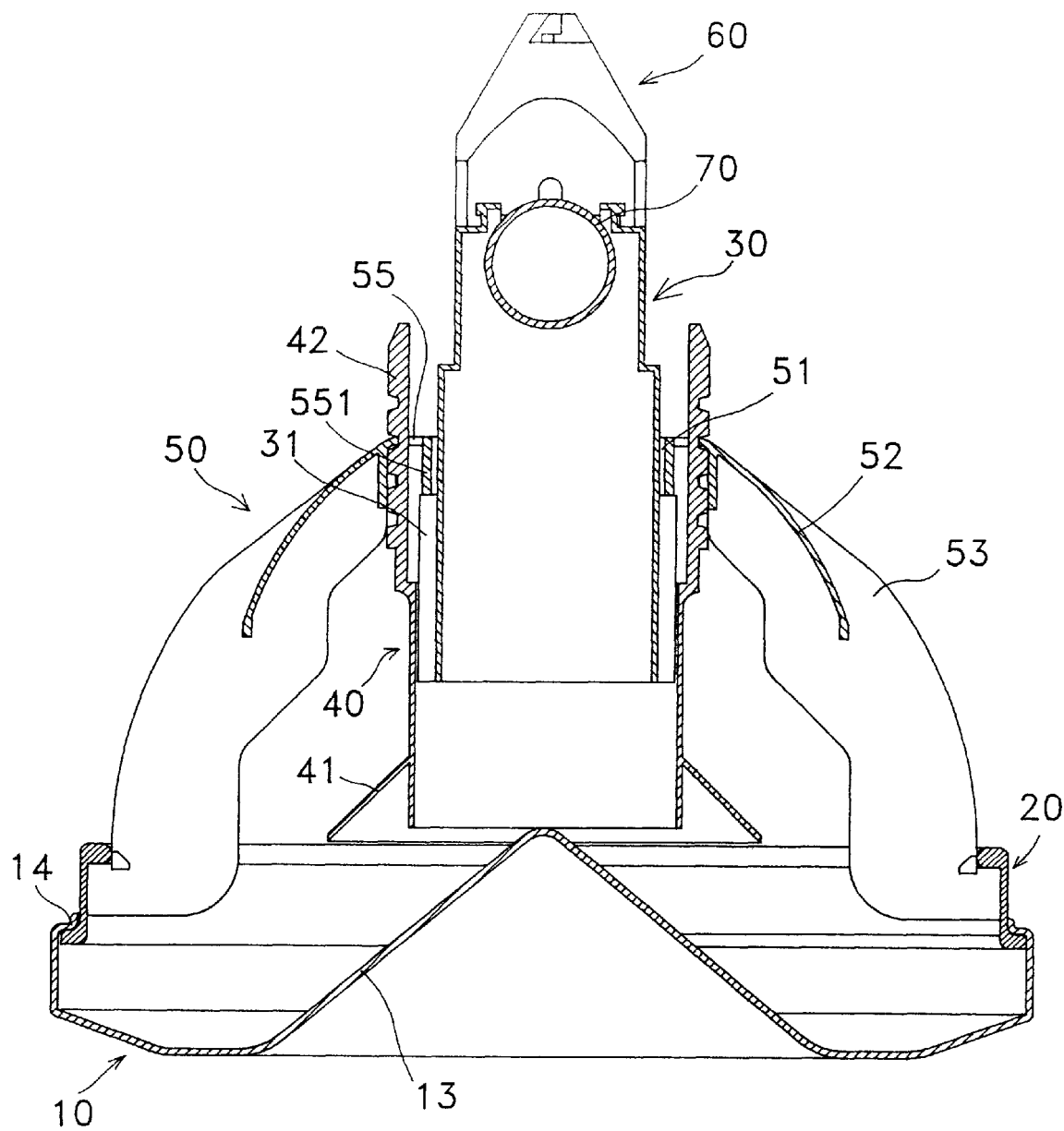
FIG. 9 is a side view in section of FIG. 2.

Referring to FIG. 9 and FIGS. 1 and 2 again, the adjustment socket 40 is a hollow cylinder having a skirt 41 fitting over the conical projecting 13 on the feed carrier plate 10, and two upright locating rods 42 bilaterally extending from the topmost edge thereof and fastened to the center mounting hole 51 on the dome 52 of the feed carrier holder 50. The upright locating rods 42 have each serrations 43 vertically disposed at an outer side for fastening to the rectangular notches 55 on the dome 52 of the feed carrier holder 50. When the upright locating rods 42 are forced inwards, the serrations 43 are disengaged from the rectangular notches 55, and the adjustment socket 40 can then be lifted or lowered to adjust the gap between the skirt 41 and the conical projecting portion 13 on the feed carrier plate 10. After adjustment, the upright locating rods 42 are released from the hand, permitting the serrations 43 to be forced by the spring force of the springy material property of the upright locating rods 42 into engagement with the rectangular notches 55 to secure the adjustment socket 40 at the adjusted elevation.

Figure 10:
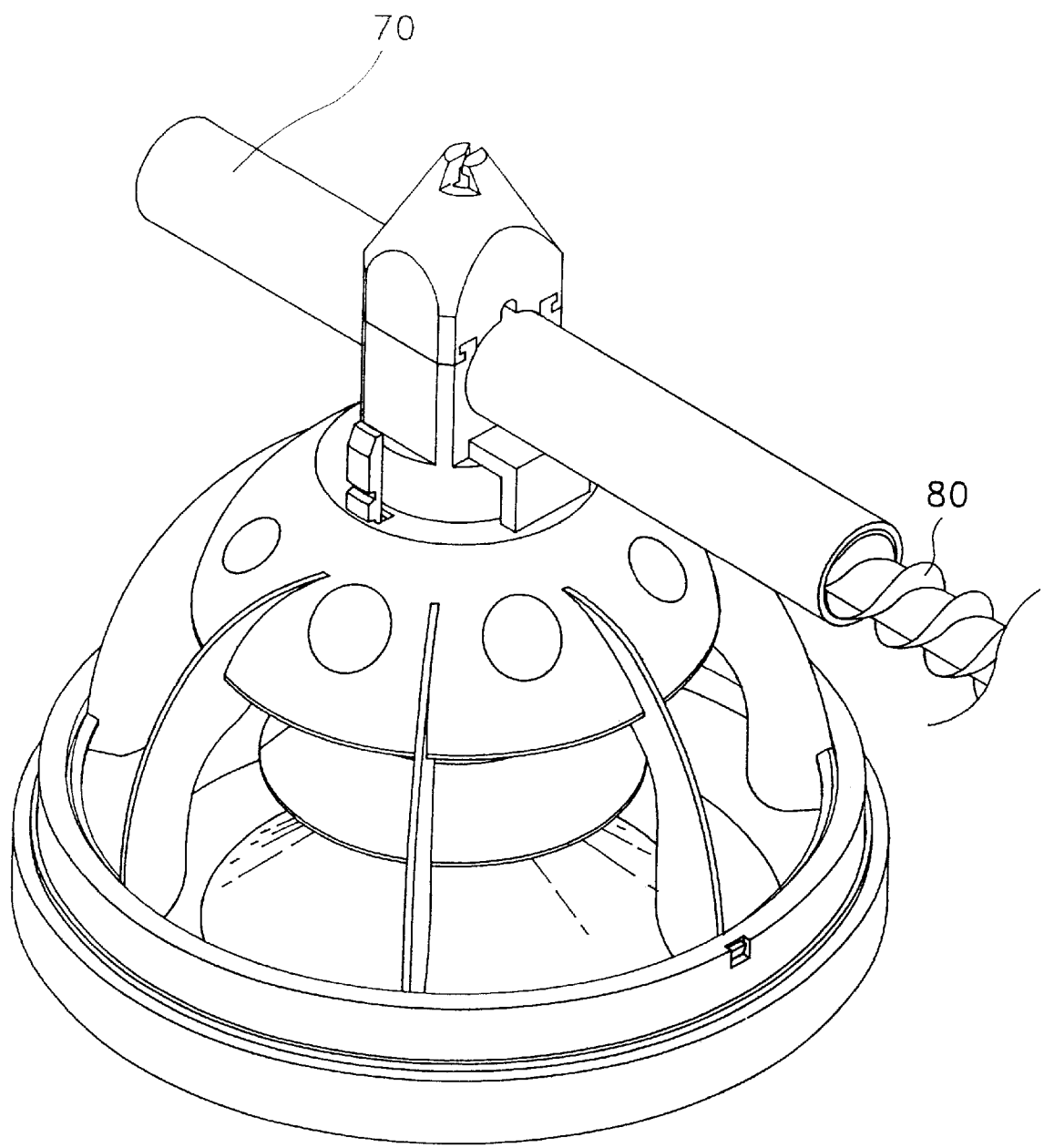
FIG. 10 is an installed view of the present invention, showing the feeding tube and the retainer cap fastened to the delivery pipe.
Figure 11:
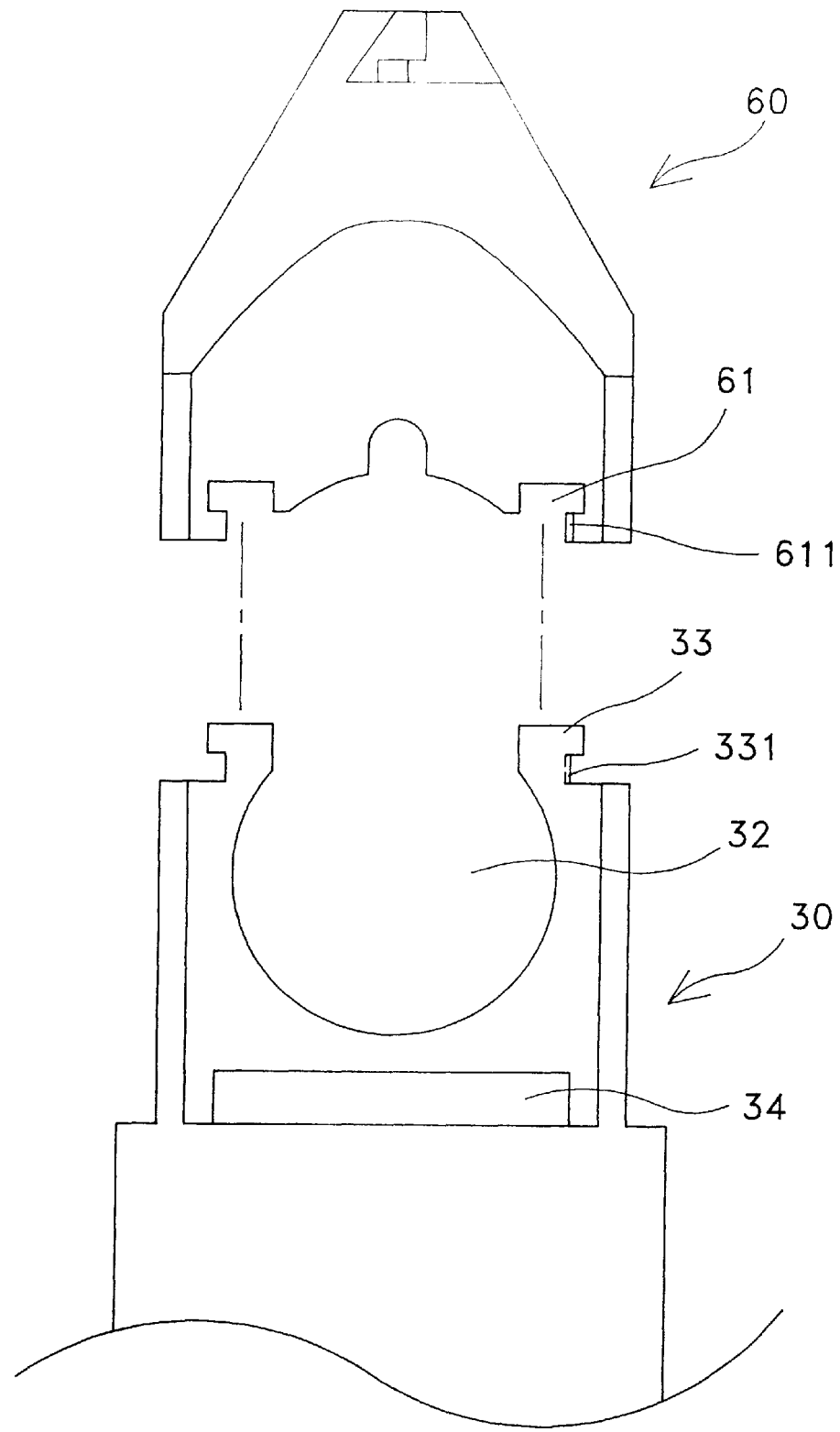
FIG. 11 is a front view in an enlarged scale of the feeding tube and the retainer cap according to the present invention.

Referring to FIGS. 9, 10 and 11 and FIGS. 1 and 2 again, the feeding tube 30 comprises a plurality of stop flanges 31 raised from the outside wall thereof at the bottom side which are stopped below the downward locating flanges 551 inside the dome 52 of the feed carrier holder 50 when the feeding tube 30 is inserted through the adjustment socket 40 and the center mounting hole 51 on the dome 52 of the feed carrier holder 50, a mouth 32 at the top which fits over the periphery of the delivery pipe, referenced by 70, a transverse slot 34 below the mouth 32, a stop plate 35 detachably inserted into the transverse slot 34 to close the mouth 32, and two transverse coupling tongues 33 bilaterally disposed at the top side of the mouth 32. A propelling screw 80 is mounted in the delivery pipe 70, and turned to propel feed to the mouth 32 on the feeding tube 30. The retainer cap 60 is adapted to secure the feeding tube 30 to the delivery pipe 70, having two coupling grooves 61 for engagement with the transverse coupling tongues 33 of the feeding tube 30. Sloping surface portions 331;611 are respectively provided at the transverse coupling tongues 33 and the coupling grooves 61, so that the transverse coupling tongues 33 of the feeding tube 30 can be conveniently forced into engagement with the coupling grooves 61 on the retainer cap 60 (see FIG. 11).

Figure 12:
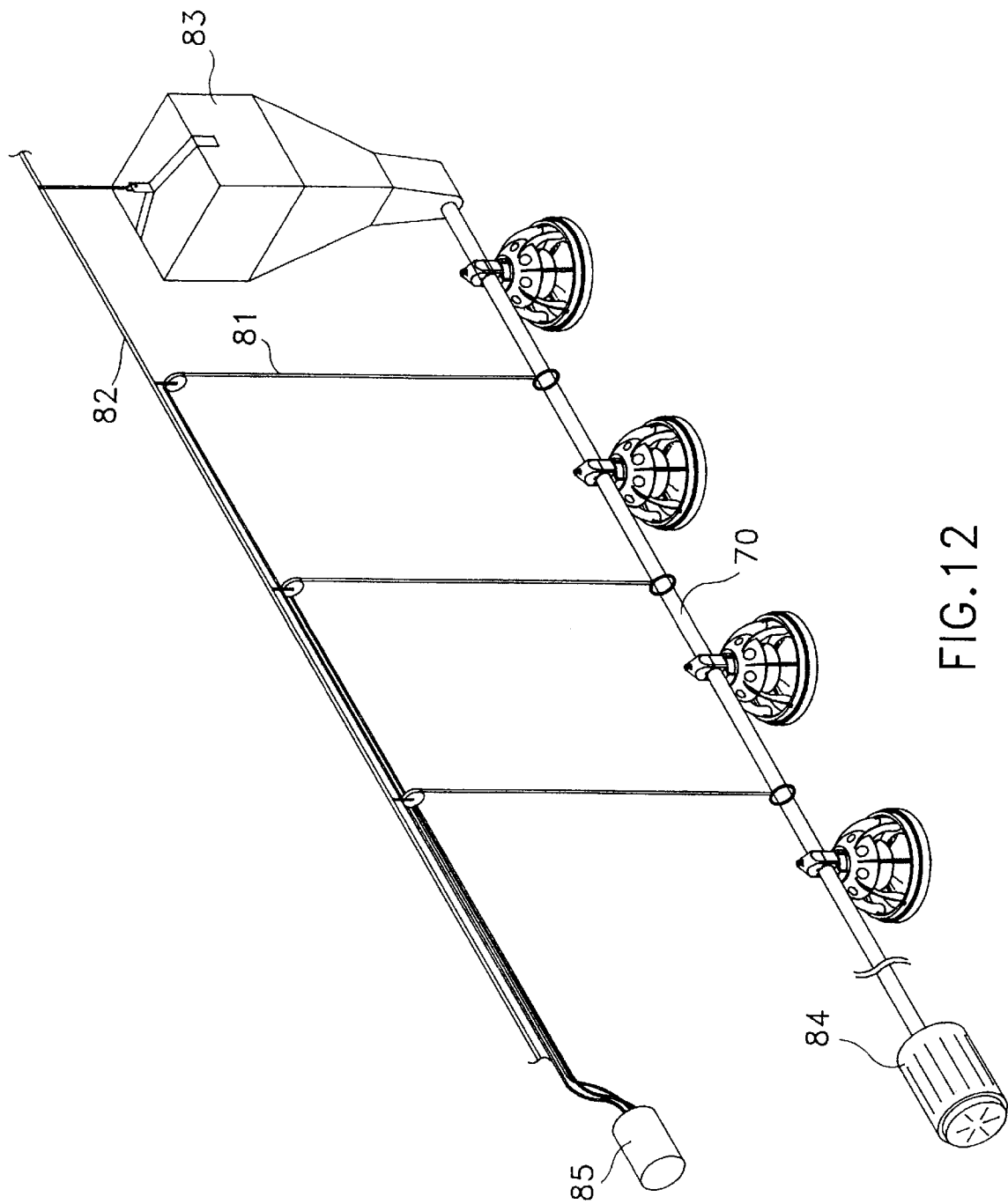
FIG. 12 shows an application example of the present invention.

Referring to FIG. 12 and FIG. 10 again, the delivery pipe 70 is suspended from a ceiling rack 82 by cables 81, and connected between a storage tank 83 and a motor 84. The cables 81 are respectively inserted through pulleys at the ceiling rack 82, and connected to a take-up device 85. By means of controlling the take-up device 85, the poultry feeders which are hung on the delivery pipe 70 are moved vertically to the desired elevation. By means of controlling the motor 84, the propelling screw 80 is rotated to propel feed out of the storage tank 83 to the poultry feeders.

Referring to FIGS. 1, 5, 9, 10 and 12 again, before feeding feed to the poultry feeders, the engagement between the serrations 43 on the upright locating rods 42 and the rectangular notches 55 on the dome 52 of the feed carrier holder 50 is adjusted to control the size of the gap between the skirt 41 of the adjustment socket 40 and the conical projecting portion 13 of the feed carrier plate 10, and therefore the output flow rate of feed is controlled.

Figure 5:
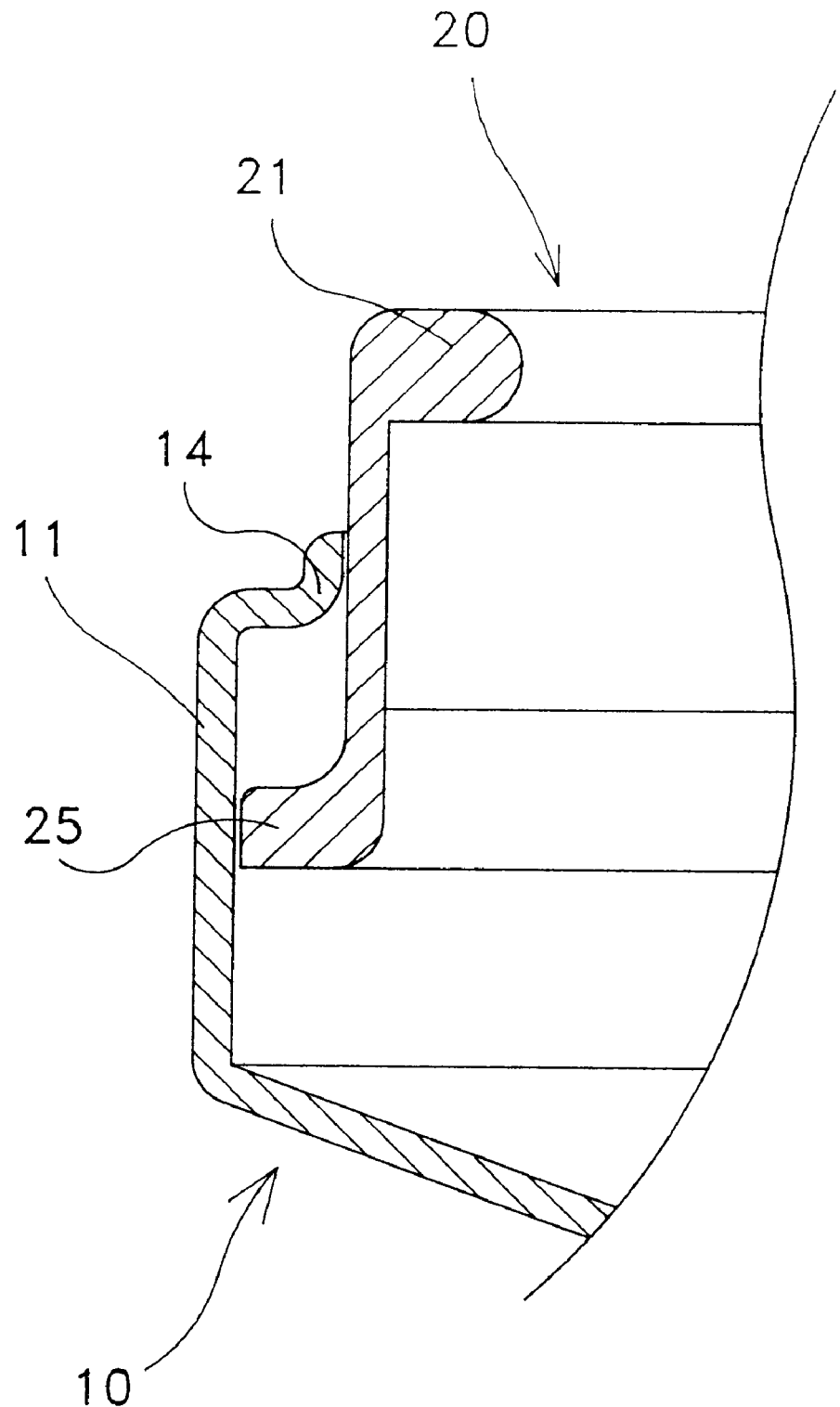
FIG. 5 is a sectional view in an enlarged scale of a part of the present invention, showing the feed carrier plate coupled to the coupling ring.

As indicated above, the feed carrier plate 10 can be moved vertically relative to the coupling ring 20 within a limited distance (see FIG. 5). When the poultry feeder is put on the ground, the coupling ring 20 falls to the lower limit, the holding space defined within the feed carrier plate 10 and the coupling ring 20 is minimized. This arrangement is suitable for feeding chicks, green ducks, etc. When the poultry are gradually growing up, the poultry feeder is lifted from the ground, causing the feed carrier plate 10 to lower from the coupling ring 20, and therefore the holding capacity of the feed carrier plate 10 is relatively increased, and at the same time the output flow rate of feed is relatively adjusted by changing the engagement between the upright locating rods 42 of the adjustment socket 40 and the rectangular notches 55 on the dome 52 of the feed carrier holder 50.

Further, when washing the poultry feeder, the angled strips 58 are squeezed inwards and closely attached to each other for permitting the binding ring 57 to be moved with the feed carrier holder 50 away from the top coupling flange 21 of the coupling ring 20.

While only one embodiment of the present invention has been shown and described, it will be understood that various modifications and changes could be made thereunto without departing from the spirit and scope of the invention disclosed.

What the invention claimed is:

1. A poultry feeder comprising:

a feed carrier plate for holding feed for feeding poultry, said feed carrier plate comprising a bottom wall, an upright annular wall raised around the border of said bottom wall, an inward coupling flange perpendicularly inwardly extended from a topmost edge of said upright annular wall, and a conical projecting portion raised from a top side of said bottom wall at the center thereof;

a feed carrier holder, said feed carrier holder comprising a dome, said dome having a center mounting hole, two locating notches horizontally aligned at two opposite sides of said center mounting hole, and a plurality of downward locating flanges axially downwardly extended from the border of said center mounting hole, a plurality of arched ribs radially downwardly extended from said dome with each terminating in a respective outwardly extended stop endpiece, a split binding ring fixedly fastened to the stop endpieces of said arched ribs at a top side thereof, two angled strips respectively extending from two opposite ends of said split binding ring and spaced from each other by a gap, and a curved locating rod extending from said binding ring opposite to said angled strips;

a coupling ring coupled between said feed carrier plate and said feed carrier holder, said coupling ring comprising an inwardly extended top coupling flange coupled to the angled strips of said feed carrier holder and the endpieces of said arched ribs of said feed carrier holder at a top side thereof, an outwardly extended bottom coupling flange coupled to the inward coupling flange on said feed carrier plate, a mounting hole which receives the curved locating rod of said feed carrier holder, and a plurality of supporting rods extending upwardly from an inside wall thereof below said top coupling flange which support the angled strips of said feed carrier holder and the endpieces of said arched ribs of said feed carrier holder;

a socket coupled to the center mounting hole on said feed carrier holder, said socket having two upright locating rods bilaterally extending upwardly from the topmost edge thereof and respectively fastened to the locating notches on the dome of said feed carrier holder;

a feeding tube mounted in said socket and secured to a delivery pipe to suspend said feed carrier holder from said delivery pipe and to guide feed from said delivery pipe to said feed carrier plate for feeding poultry, said feeding tube comprising a plurality of stop flanges extending from an outside wall thereof and stopped below the downward locating flanges inside said dome of said feed carrier holder, a mouth at a top side thereof which fits over the periphery of said delivery pipe, and two transverse coupling tongues bilaterally disposed at a top side of said mouth; and a retainer cap fastened to said feeding tube to secure said feeding tube to said delivery pipe, said retainer cap having two coupling grooves respectively engaged with the transverse coupling tongues on the feeding tube.

2. The poultry feeder of claim 1, wherein the bottom coupling flange of said coupling ring can be moved vertically with said coupling ring between the inward coupling flange on the upright annular wall of said feed carrier plate and the bottom wall of said feed carrier plate.

3. The poultry feeder of claim 1, wherein the locating notches on the dome of said feed carrier holder are polygonal through holes.

4. The poultry feeder of claim 1, wherein said dome of said feed carrier holder has a plurality of through holes spaced around the center mounting hole thereof.

5. The poultry feeder of claim 1, wherein said socket has a skirt at a bottom side thereof that fits over the conical projecting portion on the bottom wall of said feed carrier plate, and guides feed from said feeding tube to said feed carrier plate.

6. The poultry feeder of claim 1, wherein the upright locating rods of said socket have each a plurality of adjustment serrations vertically and linearly arranged at an outer side thereof for engagement with the locating notches on the dome of said feed carrier holder.

7. The poultry feeder of claim 1, wherein the transverse coupling tongues of said feeding tube and the coupling grooves on said retainer cap have a respective sloping surface portion such that the coupling tongues of said feeding tube are forced into engagement with the coupling grooves on said retainer cap.

8. The poultry feeder of claim 1, wherein said feeding tube comprises a transverse slot below the feed thereof, and a stop plate moved in and out of said transverse slot to control the passage of said mouth.

* * * * *